United States Patent
Gaur et al.

(10) Patent No.: US 10,162,756 B2
(45) Date of Patent: Dec. 25, 2018

(54) MEMORY-EFFICIENT LAST LEVEL CACHE ARCHITECTURE

(71) Applicant: Intel Corporation, Santa Clara, CA (US)

(72) Inventors: Jayesh Gaur, Bengaluru (IN); Ayan Mandal, Bengaluru (IN); Anant Nori, Bengaluru (IN); Sreenivas Subramoney, Bengaluru (IN)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 15/408,731

(22) Filed: Jan. 18, 2017

(65) Prior Publication Data
US 2018/0203799 A1 Jul. 19, 2018

(51) Int. Cl.
*G06F 12/08* (2016.01)
*G06F 12/0811* (2016.01)

(52) U.S. Cl.
CPC .... *G06F 12/0811* (2013.01); *G06F 2212/283* (2013.01)

(58) Field of Classification Search
CPC .................................................. G06F 12/0811
See application file for complete search history.

(56) References Cited

U.S. PATENT DOCUMENTS

| 5,924,121 A * | 7/1999 | Arimilli | G06F 12/0804 |
| | | | 711/118 |
| 6,615,308 B1 * | 9/2003 | Fanning | G06F 13/28 |
| | | | 710/35 |

* cited by examiner

*Primary Examiner* — Edward J Dudek, Jr.
(74) *Attorney, Agent, or Firm* — Lowenstein Sandler LLP

(57) ABSTRACT

A memory-efficient last level cache (LLC) architecture is described. A processor implementing a LLC architecture may include a processor core, a last level cache (LLC) operatively coupled to the processor core, and a cache controller operatively coupled to the LLC. The cache controller is to monitor a bandwidth demand of a channel between the processor core and a dynamic random-access memory (DRAM) device associated with the LLC. The cache controller is further to perform a first defined number of consecutive reads from the DRAM device when the bandwidth demand exceeds a first threshold value and perform a first defined number of consecutive writes of modified lines from the LLC to the DRAM device when the bandwidth demand exceeds the first threshold value.

17 Claims, 12 Drawing Sheets

MEMORY-EFFICIENT LAST LEVEL CACHE ARCHITECTURE

The present disclosure pertains to the field of processors and, in particular, to memory-efficient last level cache architecture.

BACKGROUND

A processing device may read data from memory to execute instructions. Data in memory may be accessed multiple times in near succession requiring multiple reads of the same data. Once data is accessed a first time, the data may be cached to maintain a copy of the data for faster accessibility by the processing device, removing the cost of performing multiple reads from memory.

A processor cache is a hardware cache used by the processor of a computer to reduce the average time and/or energy to access data from main memory. A cache may be a smaller, faster memory, which stores copies of the data from frequently used main memory locations. A processor may be associated with different levels of cache. One such level may be a last level cache (LLC). In one embodiment, a last level cache may be shared among one or more processors, and may be accessed just before resorting to accessing main memory.

BRIEF DESCRIPTION OF THE DRAWINGS

Various embodiments of the present disclosure will be understood more fully from the detailed description given below and from the accompanying drawings of various embodiments of the disclosure. The drawings, however, should not be taken to limit the disclosure to the specific implementations, but are for explanation and understanding only.

DESCRIPTION OF EMBODIMENTS

Figure 1:
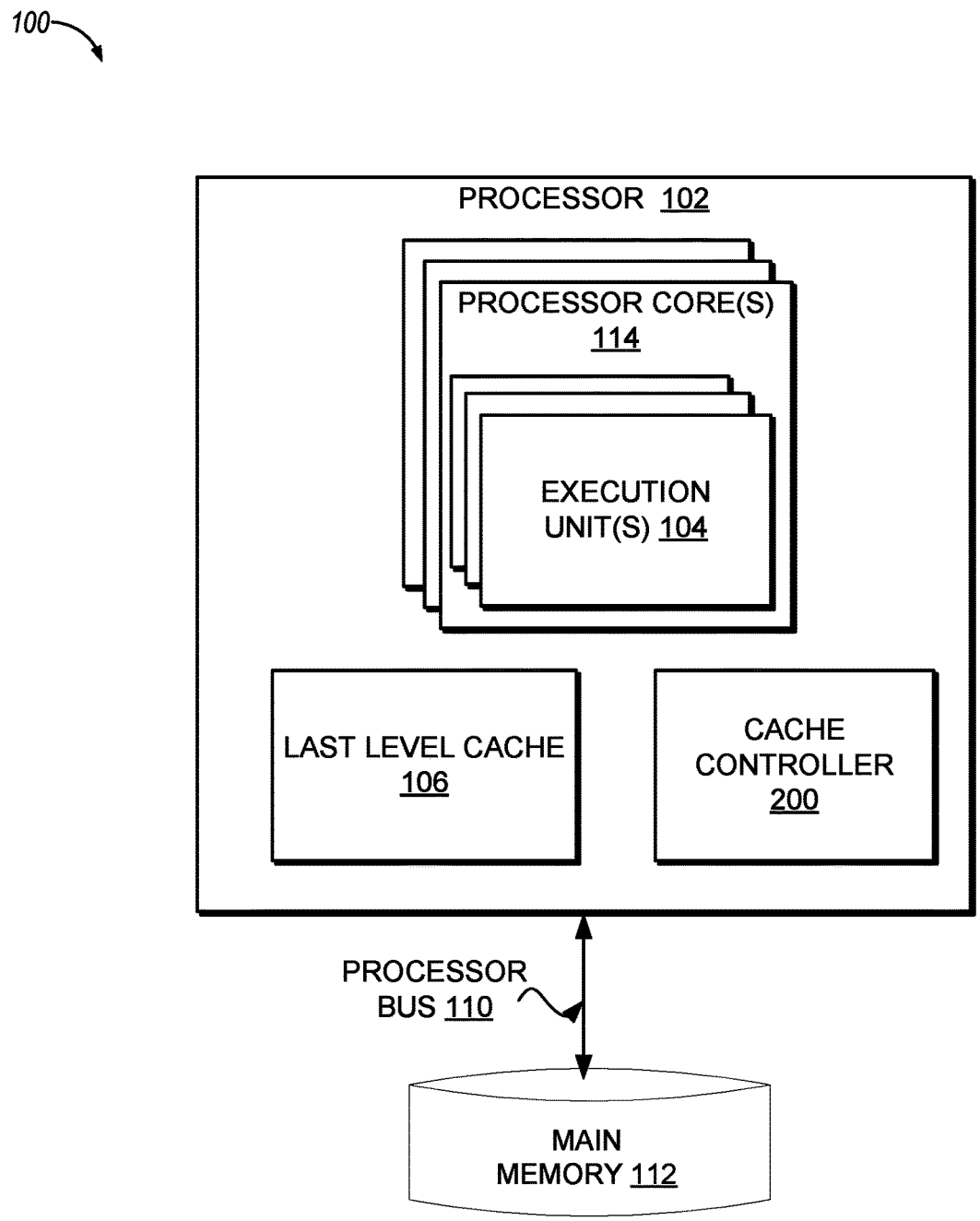
FIG. 1 is a block diagram illustrating an example system architecture in which implementations of the present disclosure may operate, according to one embodiment.

In one embodiment, bandwidth between a processor core and main memory, typically dynamic random-access memory (DRAM) devices, may limit the performance of throughput-oriented workloads in integrated graphics and multi-core processor environments. A large last level cache (LLC) can help reduce the fraction of requests served by the main memory. This may improve performance, since reading data associated with the request from the LLC may be faster than reading from main memory. In various embodiments, LLC optimizations may focus on improving the hit rate in the LLC in order to reduce traffic at main memory. These optimizations may fail to take memory efficiency into account, however. DRAM devices may be subject to various inefficiencies like read-to-write turnarounds, row buffer locality, and low refresh rates, for example. Furthermore, LLC lines written to the main memory may utilize significant DRAM bandwidth (e.g., bandwidth of a channel between a processor core and a DRAM device), thereby reducing available memory bandwidth. These inefficiencies may result in significantly lower bandwidth from the DRAM devices. Making the DRAM more efficient can improve system bandwidth.

In one embodiment, improving memory efficiency can provide higher gains, even if improving the memory efficiency costs some drop in the LLC hit rate. For example, at a baseline hit rate of 40% and memory efficiency of 60%, improving memory efficiency to 70% while reducing hits by 10% may provide a gain of 9% overall system bandwidth. This indicates that small drops in LLC hit rate may be traded off for significantly increased memory efficiency in phases were memory bandwidth may be a limiter.

The embodiments described herein are directed to memory-efficient LLC architectures that take advantage of the above determination by improving memory efficiency while sacrificing small amounts of LLC hit rate. In one embodiment, memory-efficient LLC architecture may be dynamic in that it may be active in phases of high memory (DRAM) bandwidth demand and not active in phases of low DRAM bandwidth demand. Advantageously, dynamic memory-efficient LLC architecture may mitigate a loss in performance in high LLC hit rate or low bandwidth scenarios.

To address the above deficiencies, memory-efficient LLC architectures, as described in the embodiments herein, may provide dynamic detection of bandwidth demand. Memory-efficient LLC architecture operations may be activated during an application's high bandwidth phases, where memory efficiency matters more to throughput performance than read latency. In phases where memory bandwidth is a limiter, memory-efficient LLC architecture may convert the LLC into a large buffer, and duty cycle between read phases and write phases by dynamically switching LLC replacement policies. This may result in a hit rate loss, but also an improvement in read bandwidth at memory, thereby improving overall performance.

The resultant long read-chains and write-chains may additionally help overcome efficiency losses from DRAM read-write turnarounds and excessive paging, thereby further improving memory bandwidth delivery. Embodiments of the memory-efficient LLC architecture described herein may also improve memory bank-level-parallelism (BLP)

achieved during the write-phase by intelligently selecting specific dirty (e.g., modified) cache lines in the LLC to write. In one embodiment, to reduce access latency, memory is split into multiple equal-sized units called banks. Each bank may store tens of thousands of pages. A memory bank may service one request at a time. Any other accesses to the same bank may wait for the previous access to complete, known as a bank-conflict. In contrast, memory access to different banks can proceed in parallel (known as bank-level parallelism (BLP)). In one embodiment, memory-efficient LLC architecture operations may be implemented by a controller of the LLC, as described herein.

FIG. 1 is a block diagram illustrating a computing system 100 that implements a cache controller 200 for a memory-efficient LLC architecture. The computing system 100 is formed with a processor 102 coupled to a main memory 112. Computing system 100 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines that individually or jointly execute a set (or multiple sets) of instructions to perform any one or more of the methodologies discussed herein.

In one embodiment, processor 102 includes one or more processor cores 114. Processor 102 and/or processor core 114 may include one or more execution units 104 to execute a memory-efficient LLC architecture operation in accordance with one or more embodiments as described herein. In one embodiment, processor core 114 communicates with cache controller 200 to execute the memory-efficient LLC architecture operations. Additional details with regard to cache controller 200 are described in more detail below with respect to FIGS. 2-5.

In the illustrated embodiment of FIG. 1, processor 102 and/or processor core 114 includes one or more execution units 104 to implement a process that is to perform at least one instruction. One embodiment may be described in the context of a single processor desktop or server system, but alternative embodiments may be included in a multiprocessor system. System 100 may be an example of a 'hub' system architecture. The computer system 100 includes a processor 102 to process data signals. The processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, an out of order based processor, or any other processor device, such as a digital signal processor, for example. The processor 102 is coupled to a processor bus 110 (e.g., a channel) that transmits data signals between the processor 102 and other components in the system 100, such as main memory 112. The other components of the system 100 may include, but are not limited to, a graphics accelerator, a memory controller hub, an I/O controller hub, a wireless transceiver, a Flash BIOS, a network controller, an audio controller, a serial expansion port, and an I/O controller.

Processor 102 may employ execution units including logic to perform algorithms for processing data, such as in the embodiments described herein. Processor 102 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, computing system 100 executes a version of the WINDOWS™ operating system available from Microsoft Corporation of Redmond, Wash., although other operating systems (e.g., UNIX, Linux, and iOS), embedded software, and/or graphical user interfaces, may also be used. Thus, embodiments of the present invention are not limited to any specific combination of hardware circuitry and software.

Processor 102 may further include last level cache 106. Last level cache 106 may be a specialized memory unit used by processor 102 to reduce the average memory access times. Last level cache 106 may be a smaller, faster memory which stores copies of data from the most frequently used locations in main memory 112. Data may be transferred between main memory 112 and last level cache 106 in blocks of fixed size, called cache lines. When a cache line is copied from main memory 112 into last level cache 106, a cache entry is created. The cache entry may include the copied data as well as the requested memory location. When processor 102 needs to read from or write to a location in main memory 112, processor 102 may first check whether a copy of the relevant data is currently in last level cache 106. If the data is found in last level cache 106, processor 102 may read from or write to the last level cache 106. These cache accesses may typically be much faster than reading from or writing to main memory 112. In one embodiment, as long as most memory accesses are cached memory locations, the average latency of memory accesses will be closer to the cache latency than to the latency of main memory. In one embodiment, the processor 102 includes a last level cache memory 106. Depending on the architecture, the processor 102 may have a single internal cache memory or multiple levels of internal cache memories (e.g., L1 and L2). For example, the processor 102 may include an instruction cache (e.g., an L1 instruction cache) and a data cache (e.g. an L1 data cache) as part of its L1 internal cache memory. Other embodiments include a combination of both internal and external caches depending on the particular implementation and needs. Last level cache 106 may be shared among one or more cores associated with processor 102.

Last level cache 106, however, may be limited in size and/or capacity. Thus, in order to make room for a new entry on a cache miss, one of the existing entries in last level cache 106 may have to be evicted. In one embodiment, cache controller 200 may determine which cache line to evict and when to evict it based on a replacement policy. One problem with any replacement policy is that it must predict which existing cache entry is least likely to be used in the future. One popular replacement policy is known as least-recently used (LRU) and replaces the least recently accessed entry. Other replacement policies may include most recently used, least frequently used, random replacement, or some other policy.

Execution unit 104, including logic to perform integer and floating point operations, also resides in the processor 102. It should be noted that the execution unit may or may not have a floating point unit. The processor 102, in one embodiment, includes a microcode (μcode) ROM to store microcode, which when executed, is to perform processes for certain macroinstructions or handle complex scenarios. Here, microcode is potentially updateable to handle logic bugs/fixes for processor 102. Alternative embodiments of an execution unit 104 may also be used in micro controllers, embedded processors, graphics devices, DSPs, and other types of logic circuits.

System 100 further includes a main memory 112. Main memory 112 may include, but is not limited to, a dynamic random access memory (DRAM) device, a static random access memory (SRAM) device, flash memory device, or other memory device. Main memory 112 stores instructions, data, and/or page file represented by data signals that are to be executed by the processor 102. The processor 102 is coupled to the main memory 112 via a processor bus 110. A system logic chip, such as a memory controller hub (MCH) may be coupled to the processor bus 110 and main memory 112. An MCH can provide a high bandwidth memory path to main memory 112 for instruction and data storage and for storage of graphics commands, data and textures. The MCH can be used to direct data signals between the processor 102, main memory 112, and other components in the system 100 and to bridge the data signals between processor bus 110, main memory 112, last level cache 106, and system I/O, for example. The MCH may be coupled to main memory 112 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the main memory 112, chipset, and processor 102. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

For another embodiment of a system, the cache controller 200 may be used with a system on a chip. The memory for one such system may be a flash memory. The flash memory may be located on the same die as the processor and other system components. Additionally, other logic blocks, such as a memory controller or graphics controller, may also be located on a system on a chip.

Figure 2:
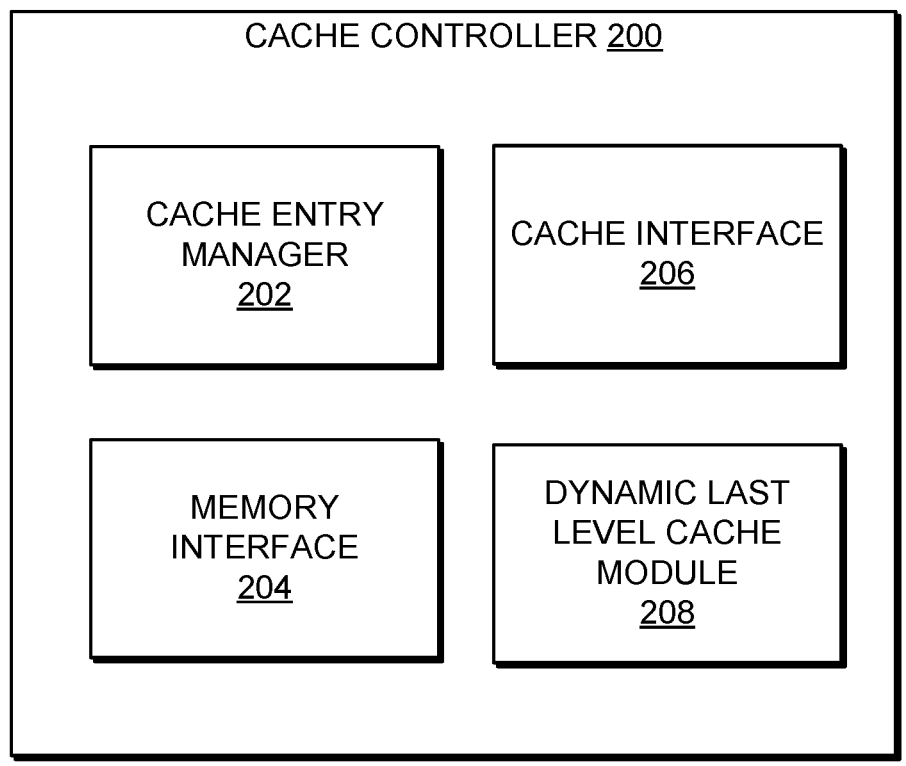
FIG. 2 is a block diagram illustrating an example cache controller in accordance with some implementations of the disclosure, according to one embodiment.

FIG. 2 is an example cache controller in accordance with some implementations of the disclosure. In general, the cache controller 200 may correspond to the cache controller 200 of a processor 102 as shown in FIG. 1. In one embodiment, the cache controller 200 includes a cache entry manager 202, a memory interface 204, a cache interface 206, and a dynamic last level cache module 208. In alternative implementations, the functionality of one or more of the components may be combined or divided.

As shown in FIG. 2, the cache controller 200 may include a cache entry manager 202 that may manage the cache entries of last level cache 106. Cache management includes the receipt of new cache entries to store in the last level cache 106, tracking of the cache entries in the last level cache 106 for cache entry characteristics, and curating the cache entries. For example, entries may be stored in the last level cache 106 when an instruction requests new data from memory to be read. Data may be read as a series of bytes (e.g., 4/8 byte values) or as a contiguous chunk of memory (e.g., 32 bytes, 64 bytes, 100 bytes). Cache entries may have a timestamp establishing when they were first stored into cache, a timestamp indicating when the entry was last used or how many times the entries have been used, and an indication (e.g., an identifier) of whether the values are clean (e.g., have not been changed while stored in cache) or dirty (e.g., have been modified while in cache). Cache entries may be curated according to cache replacement algorithms or policies (e.g., First In First Out (FIFO), Last In First Out (LIFO), Least Recently Used (LRU), Most Recently Used (MRU), Random Replacement (RR), Least-Frequently Used (LFU), or other algorithms).

The memory interface 204 may communicate with main memory 112 over processor bus 110. The memory interface 204 may receive or send data which is managed by cache entry manager 202. For example, memory interface 204 may receive a new cache to be stored in the last level cache 106 or send an evicted cache entry to main memory 112 to be stored. The memory interface 204 may utilize a page file or a table for mapping a cache entry index to a corresponding memory address. The page file or table may alternatively be stored in main memory 112, cache interface 206, cache controller 200, or in the processor 102. Memory interface 204 may further identify addresses in memory based off a physical address or an index with a pointer to memory. For example, processor 102 may receive an eviction request that includes an indication of a cache entry to evict from last level cache 106. The cache entry manager 202 may identify the cache entry using an index to a corresponding cache line.

The memory interface 204 may determine the physical memory address corresponding to the cache entry from the page file by referencing a table mapping an index of each cache line with a physical memory address in memory where the data is stored. Neighboring memory addresses may be determined by incrementing or decrementing the index value or incrementing or decrementing across of range of index values to identify addresses of the same page file that are located in close proximity in main memory 112. Neighboring memory addresses may also be spaced in memory according to the result of a hashing operation (e.g., neighbors may be spread across several nearby addresses at index values −3, +1, +5, +6, and +10) and may not reside immediately adjacent to the physical memory address. Data removed from the last level cache 106 may be written back to main memory 112 by writing the evicted value to the corresponding physical memory address.

The cache interface 206 may communicate with last level cache 106. The cache interface 206 may receive or send data which is managed by cache entry manager 202. For example, the cache entry manager 202 may receive a new cache entry to be stored in the cache or may remove an evicted cache entry from the cache using the cache interface 206. Evicted cache entries may include the data of the entry and the index to the location in the cache or the physical address in memory. The index may be referenced against the page file or table to determine the physical memory address where the value may be stored in memory.

The dynamic last level cache module 208 may perform the memory-efficient LLC architecture operations described herein. In one embodiment, the dynamic last level cache module 208 determines when to duty cycle memory read and write phases to optimize memory efficiency and performance. Dynamic last level cache module 208 may monitor memory bandwidth, determine if the memory bandwidth is below, at, or above a defined threshold value, and based on the determination, perform a defined number of reads and/or writes. Dynamic last level cache module 208 may further perform writes to memory in a way that maximizing bank level parallelism (BLP) by selecting dirty lines to write that land at different memory banks. More details describing opera rations performed by the dynamic last level cache module 208 are provided with respect to FIGS. 3-5.

Figure 3:
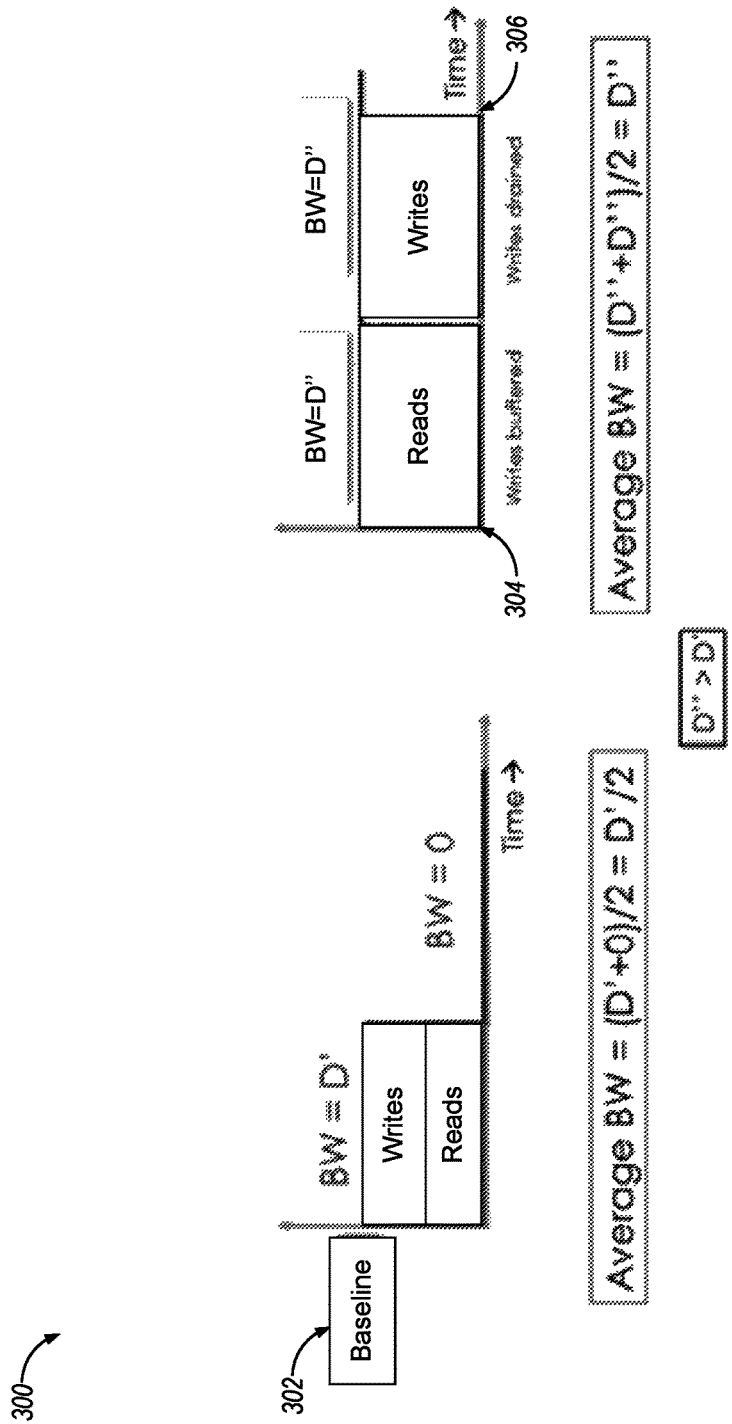
FIG. 3 is a block diagram illustrating buffered LLC writes, according to one embodiment.

FIG. 3 is a block diagram 300 illustrating buffered LLC writes, according to one embodiment. In one embodiment, DRAM devices serve both reads (LLC misses) and writes (LLC victims). In one embodiment, a DRAM device may be multiple DRAM devices. DRAM devices may be disposed on a dual in-line memory module (DIMM) or on various other carrier substrates. Performing the writes may take away valuable DRAM bandwidth that may reduce otherwise available DRAM bandwidth that could be used for reads. Performing writes may also cost DRAM efficiency because of turnaround penalty (switching from a read phase to a write phase or from a write phase to a read phase results in a drop in performance) on the DRAM bus. Advantageously, many workloads do not continuously demand high bandwidth, but instead operate in phases of high and low DRAM bandwidth demand. As shown in FIG. 3, in a first phase the baseline memory 302 receives a number of requests (e.g., both read requests and write requests) at during the same phase and supplies a bandwidth of D'. In a subsequent phase there are no requests at the DRAM device. Hence, the overall average bandwidth provided to service either a read request or a write request is D'/2.

In another embodiment, memory-efficient LLC architecture may use phases of relative inactivity at the memory to serve write bandwidth, thereby supplying higher bandwidth to reads when they request it. In one embodiment, memory-efficient LLC architecture may send a series of reads in the first phase 304, delivering a bandwidth of D" (where D">D' as turnaround penalty at the memory is mitigated). In a phase of inactivity memory-efficient LLC architecture may send out the writes 306. In this case, the average bandwidth may be D", which may be greater than two-times higher than the baseline bandwidth D'.

To achieve the partitioning of reads and writes, incoming write requests while in a read phase may be buffered in the LLC. In one embodiment, where the LLC may be between four and eight Megabytes in capacity, buffered writes resulting from long phases of high "read" activity may be stored in the LLC. Since such buffering may cause a LLC hit rate loss, memory-efficient LLC architecture may dynamically switch between replacement policies to maximize the memory efficiency and hit rate efficiency balance.

Figure 4:
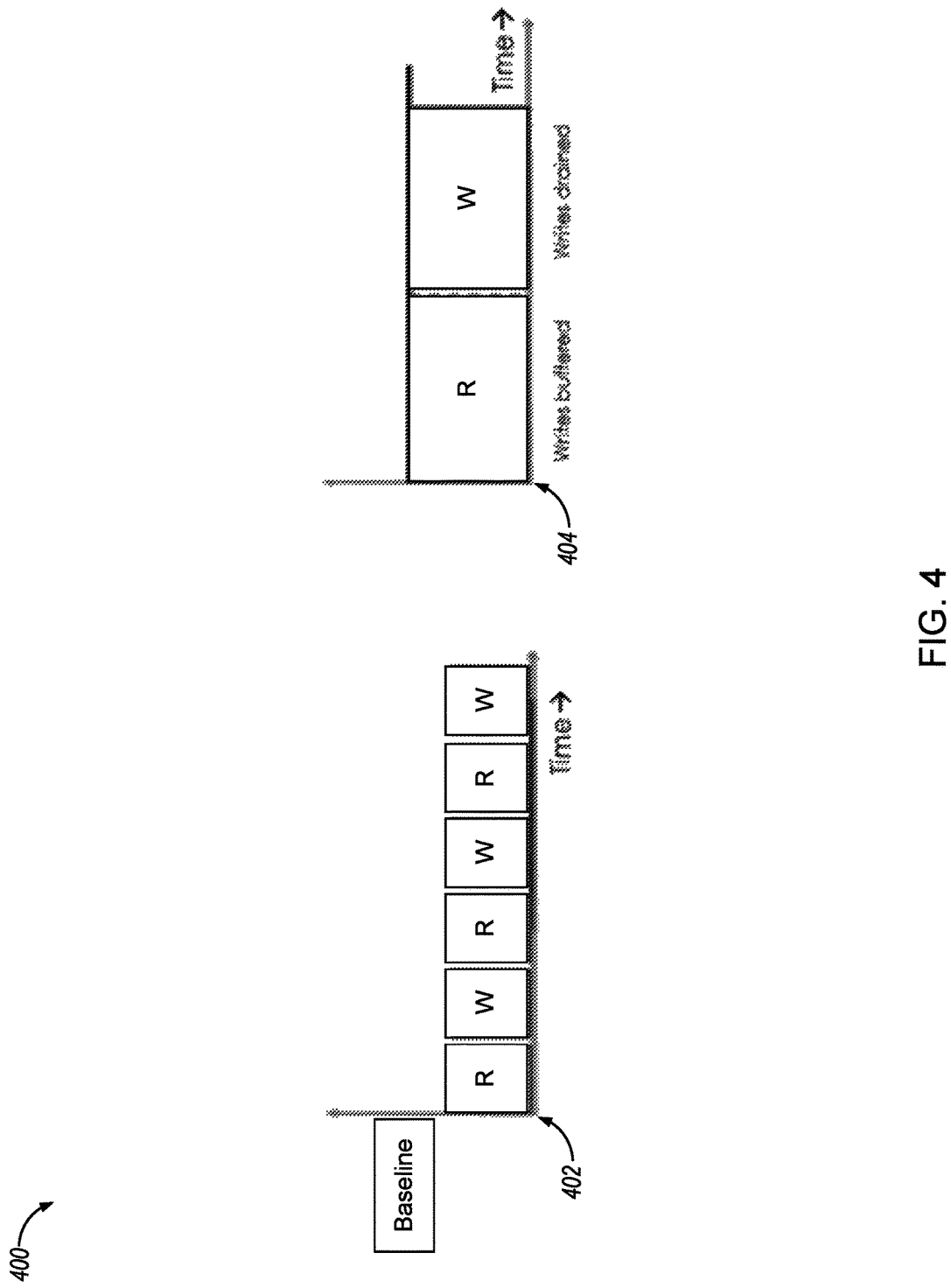
FIG. 4 is a block diagram illustrating buffered reads and writes, according to one embodiment.

FIG. 4 is a block diagram 400 illustrating buffered reads and writes, according to one embodiment. In one embodiment, DRAM memories have relatively high inefficiency because of turnaround delays when reads and writes are served together (402). To minimize the turnaround delay, cache controllers may deploy a small write buffer (e.g., 32-64 entries per channel) and try to send chains of reads and writes. Sending longer chains of reads and writes may help reduce the inefficiency, but can delay reads significantly. Sending longer chains may also utilize bigger write buffers that cost valuable area.

Memory-efficient LLC architecture mitigates the turnaround delay problem by sending long chains of reads and writes in phases of high bandwidth 404. The dynamic nature of memory-efficient LLC architecture prevents longer chains of reads and writes when memory bandwidth is sufficient, thus improving LLC hit rate in low bandwidth phases.

Figure 5:
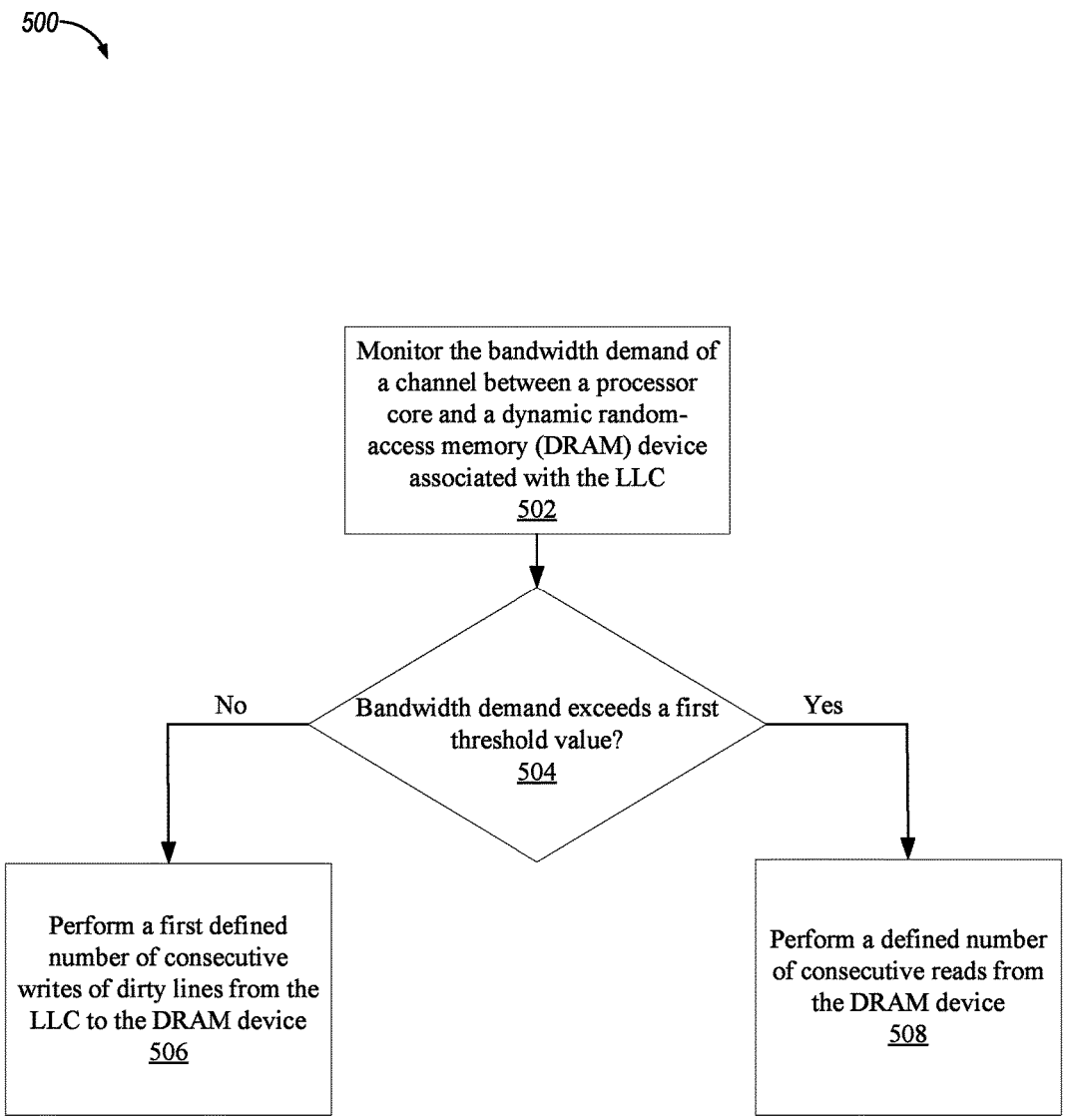
FIG. 5 is a flow diagram illustrating memory-efficient LLC architecture operations, according to one embodiment.

FIG. 5 is a flow diagram illustrating memory-efficient LLC architecture operations, according to one embodiment. The method 500 may be performed by processing logic that may include hardware (e.g., processing device, circuitry, dedicated logic, programmable logic, microcode, etc.), software (e.g., instructions run on a processing device), or a combination thereof. In some implementations, the method 500 may be performed by the cache controller 200 of FIGS. 1 and 2.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

As shown in FIG. 5, the method 500 may begin at block 502 where processing logic monitors a bandwidth demand of a channel between a processor core and a dynamic random-access memory (DRAM) device associated with the LLC. In one embodiment, processing logic monitors the memory bandwidth demand using a counter. The memory-efficient LLC architecture counter operations may be implemented in the cache controller (e.g., cache controller 200 of FIGS. 1 and 2). In one embodiment, over a window of a predefined number of cycles, the counter determines the number of read and write requests that go to memory. In one embodiment, the predefined number of cycles is 256. The predefined number of cycles may be customizable. This counter may be halved every predefined number of cycles. By halving the counter, historical bandwidth demand trends may be included in the current bandwidth demand determination. The longer ago the cycle, the less the bandwidth demand during that cycle is weighted in the current calculation. In another embodiment, the historical bandwidth demands may be weighted according to a different scale (including not weighting a historical bandwidth demand at all).

At block 504, processing logic determines if the memory bandwidth demand exceeds a first threshold value. In one embodiment, the first threshold value is a percentage of a maximum possible bandwidth. For example, the first threshold value may be 80% of maximum. Thus, when a determined bandwidth demand is 80% or higher, the first threshold value may be met. In other embodiment, various other threshold values may be used.

At block 508, processing logic may perform a defined number of consecutive reads (e.g., 256) from the DRAM device when the bandwidth demand exceeds a first threshold value. The number of consecutive reads may be customizable. In one embodiment, the bandwidth demand exceeds the first threshold value when the percentage of bandwidth demanded is equal to or above a certain percentage (e.g., 80%) of the maximum bandwidth. If the current bandwidth demand meets or exceeds the threshold, processing logic may determine that memory bandwidth is a limiter and enter a memory-efficient architecture read phase.

In the read phase, the LLC replacement policy may be switched to "clean least recently used (LRU)." In this mode, dirty lines in the set are marked as reserved and an LRU candidate is chosen from among the clean lines. This ensures that there are no write requests at memory and that the DRAM bandwidth is given to reads (whereas writes are buffered in the LLC). This may reduce the hit rate in the LLC, but as described herein, the improved DRAM bandwidth results in significant improvement.

At block 506, processing logic may perform a first defined number of consecutive writes (e.g., 256) of dirty lines from the LLC to the DRAM device in a "drain phase" when the bandwidth demand does not exceed a first threshold value.

If the bandwidth demand does not exceed the first threshold, memory-efficient LLC architecture may operate in baseline mode (without memory-efficient LLC architecture operations), and thus maximize LLC hit rate. In one embodiment, memory bandwidth not meeting the first threshold value may be an indication that the memory is undergoing a phase of low activity. Such phases of low activity may be used to clean the LLC by writing dirty data to memory during the drain phase. This operation may not invalidate the line in the LLC, but instead change the state of the line from dirty to clean. This type of opportunistic scrubbing can reduce the number of dirty victims in the LLC in phases of high bandwidth demand and give performance. Once processing logic has written a defined number of writes (e.g., 256) to memory, or the number of dirty lines in the LLC in the cache drop below a threshold value (e.g., 75%), processing logic may shift to an additional read phase, as described by block 508. In one embodiment the number of writes is customizable. If the number of dirty lines in the LLC exceeds the threshold value, processing logic may perform a second defined number of additional consecutive writes of dirty cache lines from the LLC to the DRAM device.

Since processing logic is monitoring the bandwidth demand, when a read phase or a write phase is complete, processing logic may reevaluate, and enter another read or write phase or switch phases altogether. By performing a number of reads or writes in a row (e.g. while blocking all read requests when writing and write requests when reading), processing logic may reduce turnaround penalty. Furthermore, when sending writes to memory (in drain mode), memory-efficient LLC architecture attempts to maximize bank level parallelism (BLP) by picking dirty writes that land at different banks in the DRAM device. In one embodiment, bank bits are bit 12, 13 and 14 (for 8 banks) of a physical address. Set bits in the LLC may be bits [16:6] of the physical address (e.g., 1K sets per LLC bank). Hence, to improve BLP, processing logic may picks sets that are offset by bits 12, 13, 14 and pick a dirty line from those sets. This process may be continued until all eight banks have received writes and then it shifts back to a different set index. This ensures very high BLP at the DRAM device and may improve performance.

Figures 6A, 6B:
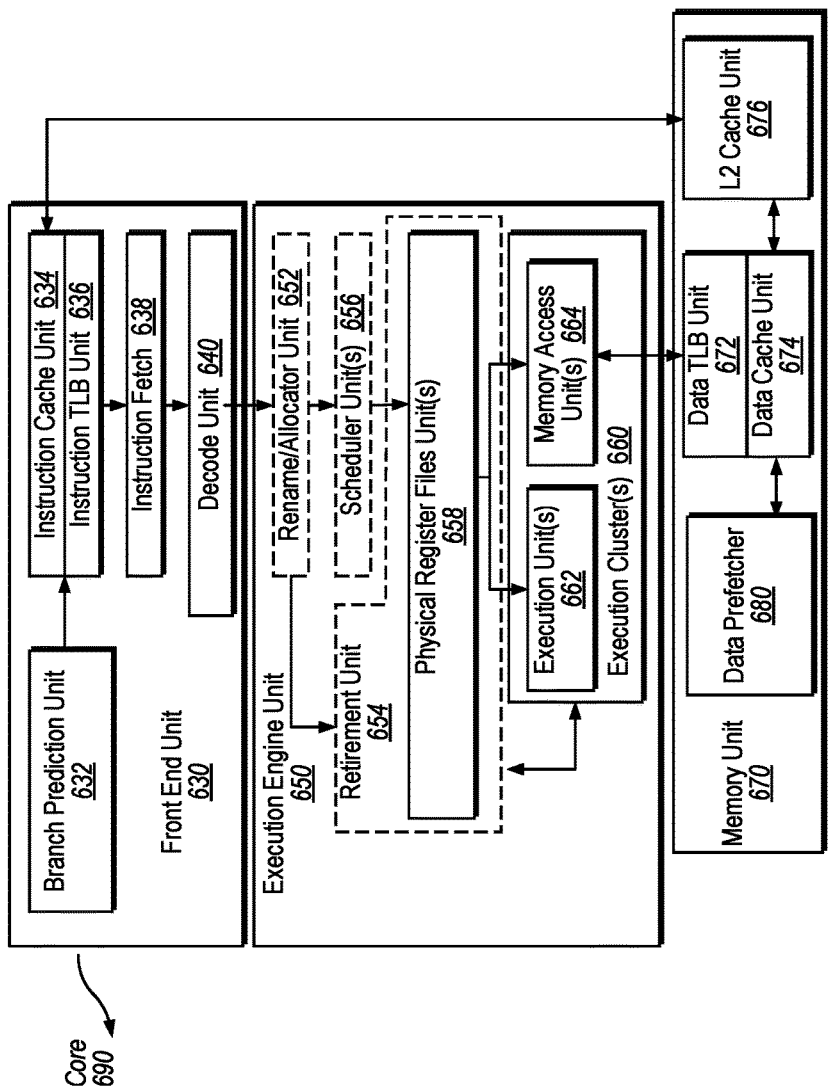
FIG. 6A is a block diagram illustrating a micro-architecture for a processor that implements memory-efficient LLC architecture operations, according to one embodiment.
FIG. 6B is a block diagram illustrating an in-order pipeline and a register renaming stage, out-of-order issue/execution pipeline, according to one embodiment.

FIG. 6A is a block diagram illustrating a micro-architecture for a processor 600 that implements memory-efficient LLC architecture operations, according to one embodiment. Specifically, processor 600 depicts an in-order architecture core and a register renaming logic, out-of-order issue/execution logic to be included in a processor according to at least one embodiment of the disclosure. The embodiments of the memory-efficient LLC architecture operations described herein can be implemented in processor 600.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the solid lined boxes in combination with the dashed lined boxes illustrate a register renaming, out-of-order issue/execution pipeline. In FIG. 6B, a processor pipeline 601 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
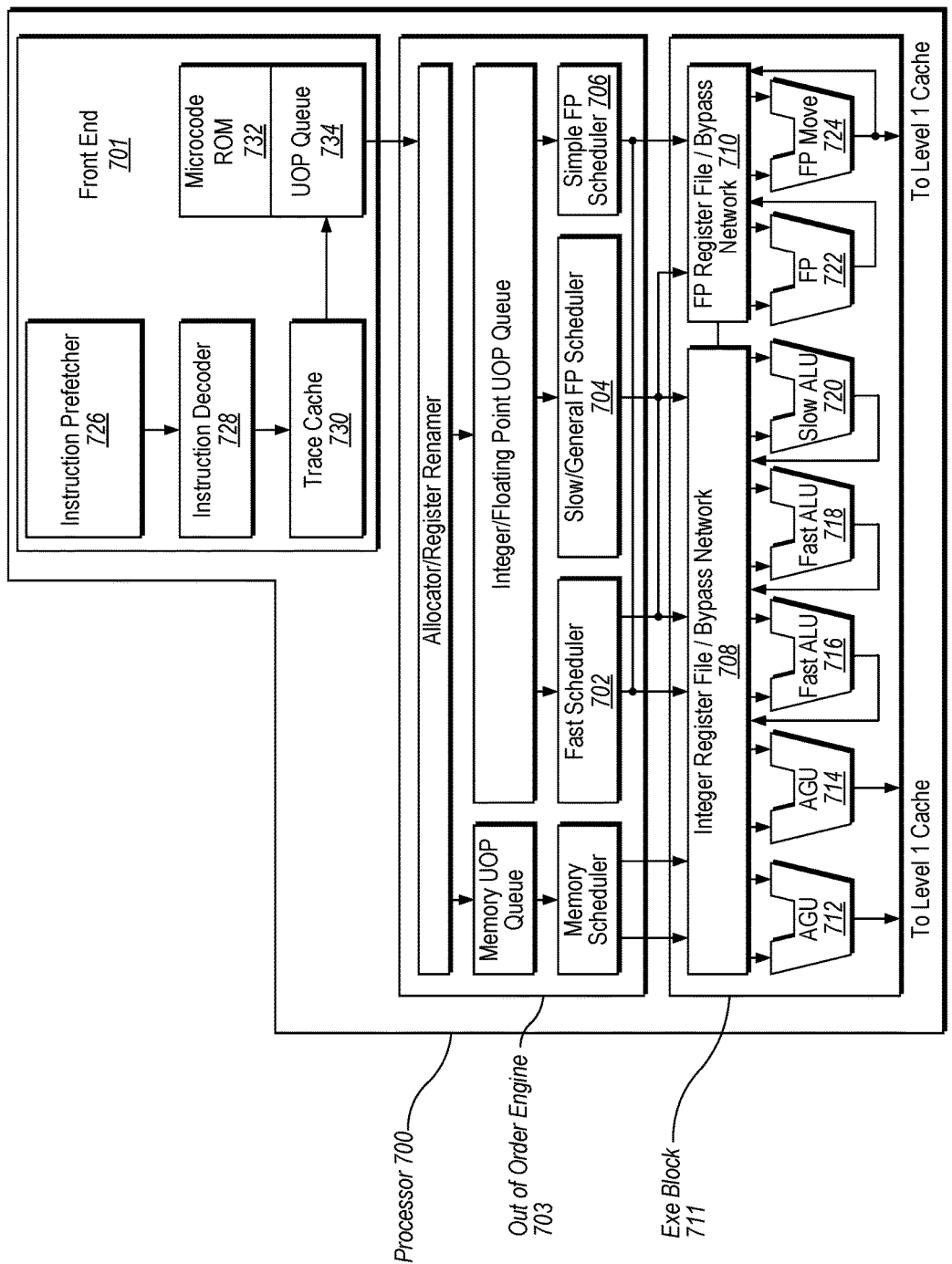
FIG. 7 illustrates a block diagram of the micro-architecture for a processor that includes logic circuits to perform memory-efficient LLC architecture operations, according to one embodiment.

FIG. 7 illustrates a block diagram of the micro-architecture for a processor 1100 that includes logic circuits to perform memory-efficient LLC architecture operations, according to one embodiment. In some embodiments, memory-efficient LLC architecture operation instructions in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The embodiments of the memory-efficient LLC architecture operations disclosed herein can be implemented in processor 700.

The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128-bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment includes a number of execution units: address generation unit (AGU) 712, AGU 714, fast ALU 716, fast ALU 718, slow ALU 720, floating point ALU 722, floating point move unit 724. For one embodiment, the floating point execution blocks 712, 714, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 710 as the slow ALU 710 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating point units 712, 714, can be implemented to support a range of operands having bits of various widths. For one embodiment, the floating point units 712, 714, can operate on 128-bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement memory-efficient LLC architecture operations according to one embodiment. In one embodiment, the execution block 711 of processor 700 may include a microcontroller (MCU), to perform memory-efficient LLC architecture operations according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
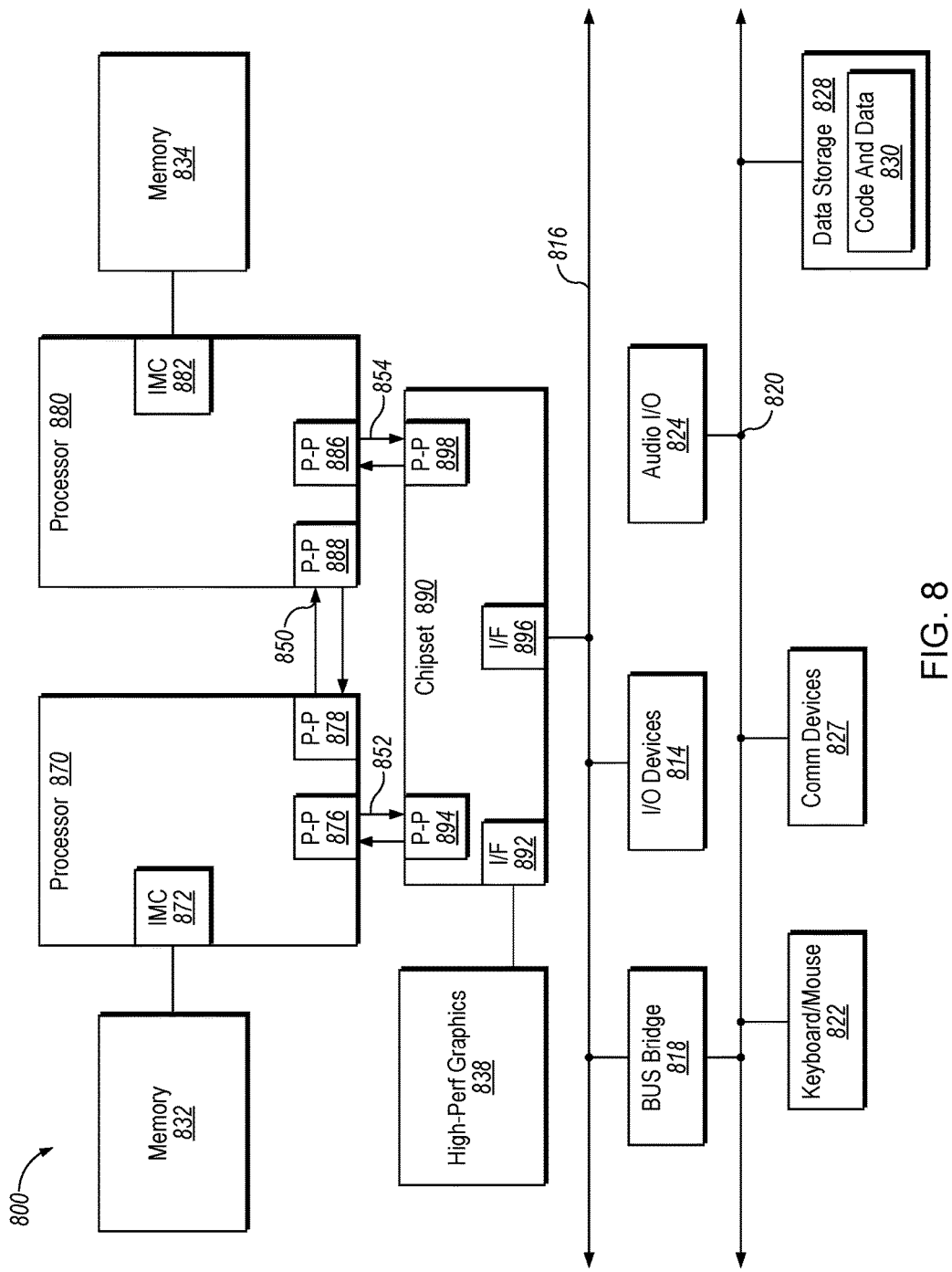
FIG. 8 is a block diagram of a computer system, according to one embodiment.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores, although potentially many more cores may be present in the processors. The processors each may include hybrid write mode logics in accordance with an embodiment of the present. Memory-efficient LLC architecture operations discussed herein can be implemented in the processor 870, processor 880, or both.

While shown with two processors 870, 880, it is to be understood that the scope of the present disclosure is not so limited. In other implementations, one or more additional processors may be present in a given processor.

Processors 870 and 880 are shown including integrated memory controller units 872 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 892. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
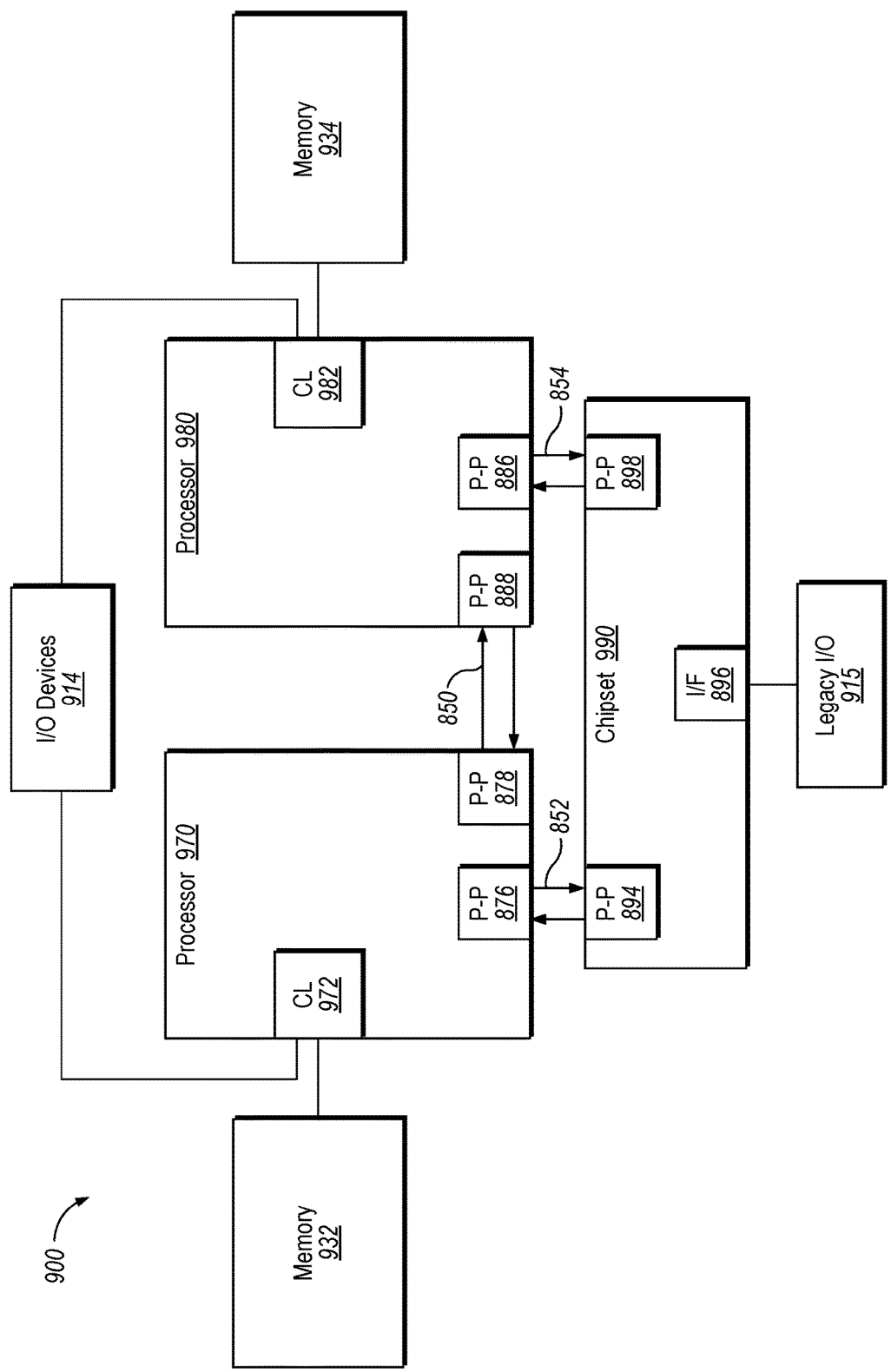
FIG. 9 is a block diagram of a computer system, according to another embodiment.

Referring now to FIG. 9, shown is a block diagram of a third system 1300 in accordance with an embodiment of the present disclosure. Like elements in FIGS. 7 and 8 bear like reference numerals, and certain aspects of FIG. 8 have been omitted from FIG. 9 in order to avoid obscuring other aspects of FIG. 9.

FIG. 9 illustrates that the processors 970, 980 may include integrated memory and I/O control logic ("CL") 972 and 982, respectively. For at least one embodiment, the CL 972, 982 may include integrated memory controller units such as described herein. In addition. CL 972, 982 may also include I/O control logic. FIG. 9 illustrates that the memories 932, 934 are coupled to the CL 972, 982, and that I/O devices 914 are also coupled to the control logic 972, 982. Legacy I/O devices 915 are coupled to the chipset 990. Operations discussed herein can be implemented in the processor 970, processor 980, or both.

Figure 10:
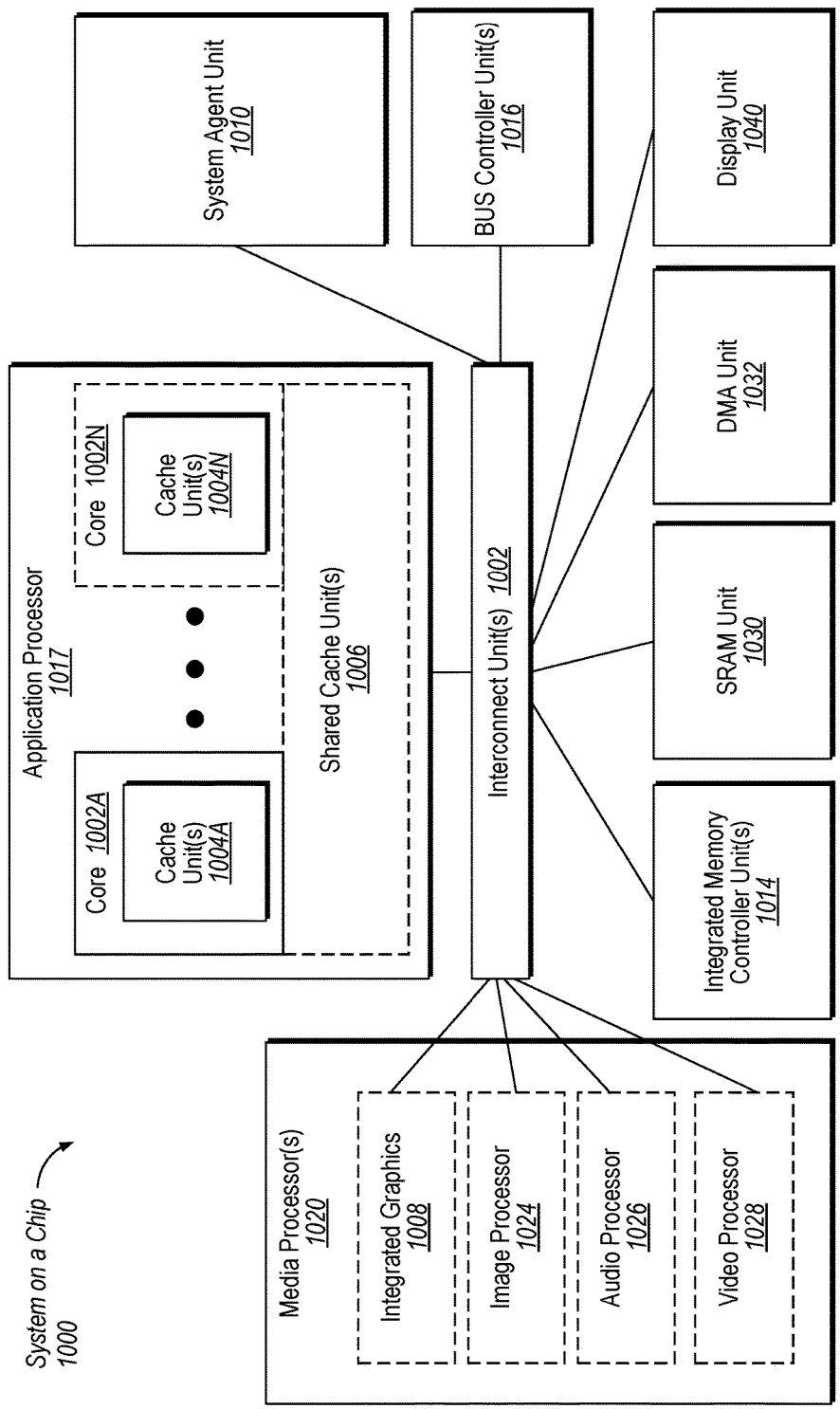
FIG. 10 is a block diagram of a system-on-a-chip, according to one embodiment.

FIG. 10 is an exemplary system on a chip (SoC) 1000 that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 10 is a block diagram of a SoC 1000 in accordance with an embodiment of the present disclosure. Dashed lined boxes are features on more advanced SoCs. In FIG. 10 an interconnect unit(s) 1002 is coupled to: an application processor 1017 which includes a set of one or more cores 1002A-N, cache unit(s) 1004A-N, and shared cache unit(s) 1006; a system agent unit 1010; a bus controller unit(s) 1016; an integrated memory controller unit(s) 1014; a set of one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. Memory-efficient LLC architecture operations discussed herein can be implemented by SoC 1000.

Figure 11:
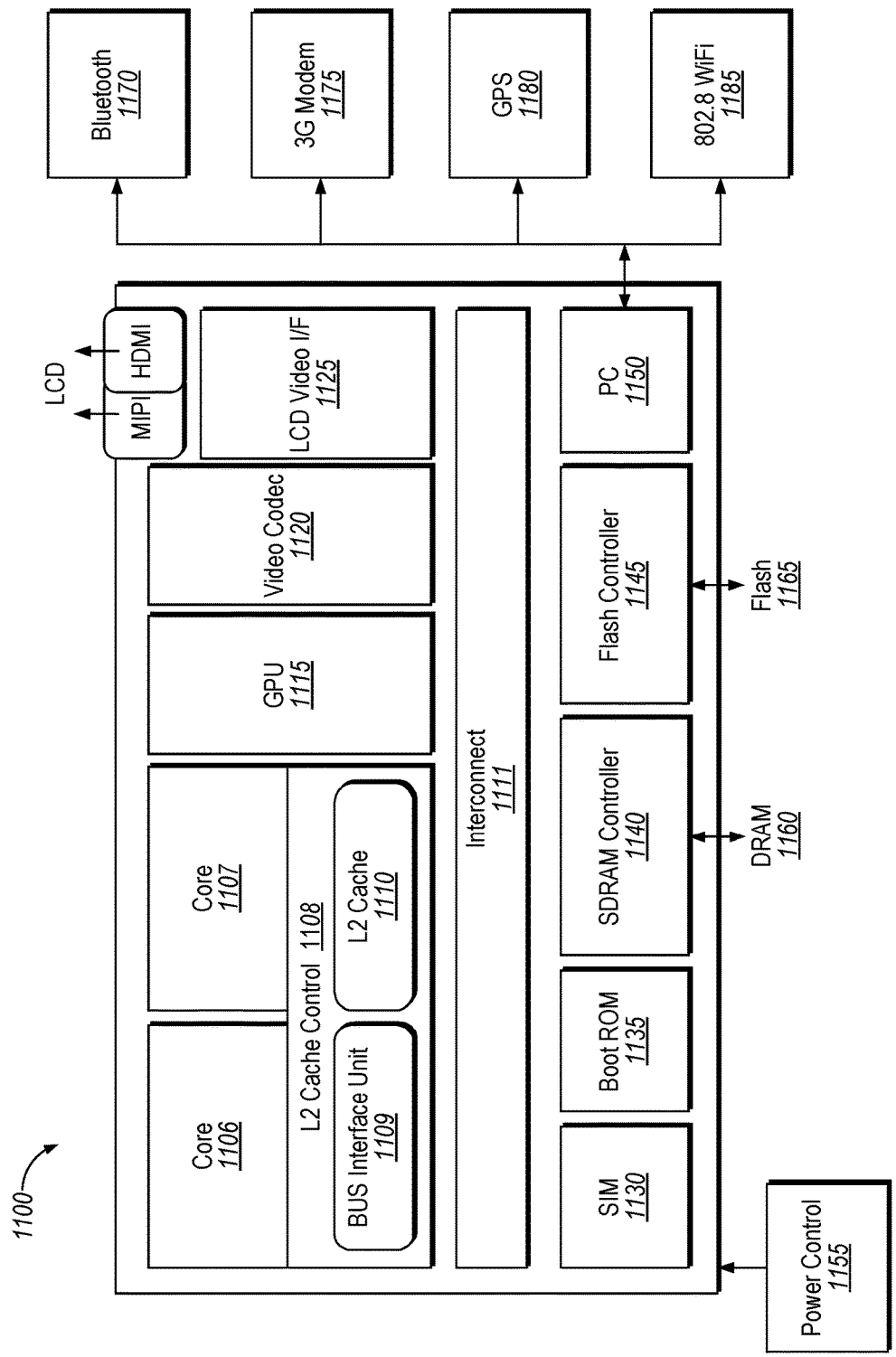
FIG. 11 illustrates another implementation of a block diagram for a computing system, according to one embodiment.

Turning next to FIG. 11, an embodiment of a system on-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. Memory-efficient LLC architecture operations discussed herein can be implemented by SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, power control 1155 to control power, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
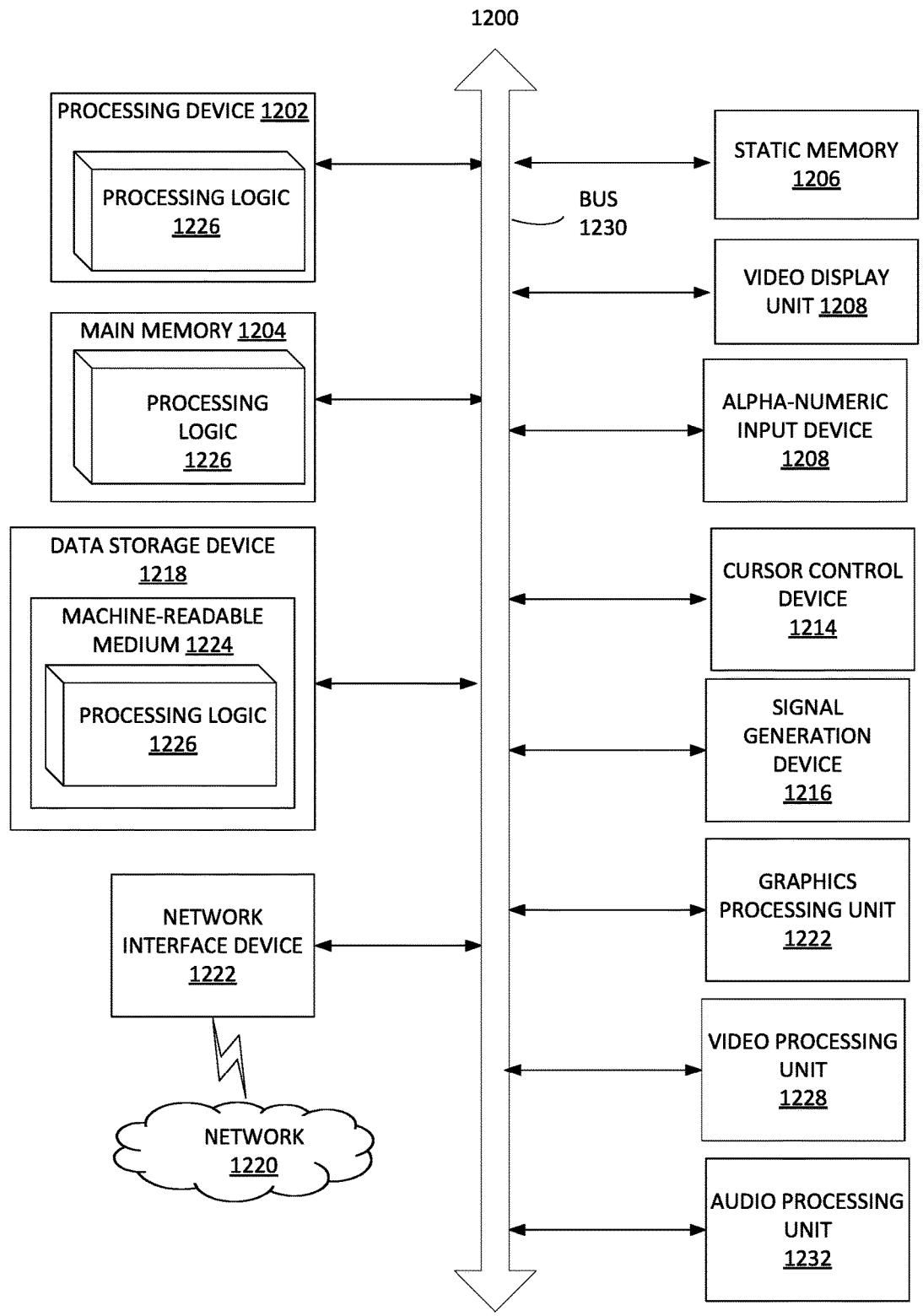
FIG. 12 illustrates another implementation of a block diagram for a computing system, according to one implementation.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1200.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1226 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application-specific integrated circuit (ASIC), a field programmable gate array (FPGA), a digital signal processor (DSP), network processor, or the like. In one embodiment, processing device 1202 may include one or more processor cores. The processing device 1202 is configured to execute the processing logic 1226 for performing the memory-efficient LLC architecture operations discussed herein. In one embodiment, processing device 1202 can be part of computing system 100. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that the physical core is simultaneously multithreading), or a combination thereof (e.g., time sliced fetching and decoding and simultaneous multithreading thereafter such as in the Intel® Hyperthreading technology).

The computing system 1200 may further include a network interface device 1222 communicably coupled to a network 1220. The computing system 1200 also may include a video display unit 1208 (e.g., a liquid crystal display (LCD) or a cathode ray tube (CRT)), an alphanumeric input device 1210 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic 1226 during execution thereof by the computing system 1200; the main memory 1204 and the processing device 1202 also constituting computer-readable storage media.

The computer-readable storage medium 1224 may also be used to store instructions 1226 utilizing the processing device 1202 and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor comprising: a processor core; a last level cache (LLC) operatively coupled to the processor core; a cache controller operatively coupled to the LLC, the cache controller to: monitor a bandwidth demand of a dynamic random-access memory (DRAM) device associated with the LLC; perform a defined number of consecutive reads from the DRAM device when the bandwidth demand exceeds a first threshold value; and perform a first defined number of consecutive writes of dirty lines from the LLC to the DRAM device when the bandwidth demand does not exceed the first threshold value.

In Example 2, the subject matter of Example 1, the cache controller further to: determine whether a number of dirty lines in the LLC exceeds a second threshold value; perform a second defined number of additional consecutive writes of dirty cache lines from the LLC to the DRAM device when the number of dirty lines in the LLC exceeds the second threshold; and perform a second defined number of additional consecutive reads from the DRAM device when the number of dirty lines in the LLC does not exceed the second threshold.

In Example 3, the subject matter of Example 2, wherein, to perform the second defined number of additional consecutive writes to the DRAM device, the cache controller is to write the dirty cache lines to different banks in the DRAM device.

In Example 4, the subject matter of Example 2, wherein the second defined number of consecutive writes from the DRAM device is 256.

In Example 5, the subject matter of Example 2, wherein the second defined number of consecutive reads from the DRAM device is customizable.

In Example 6, the subject matter of Example 1, wherein the first defined number of consecutive reads from the DRAM device is 256.

In Example 7, the subject matter of Example 1, wherein the cache controller is further to block all write operations to the DRAM device while performing the first defined number of consecutive read operations from the DRAM device.

In Example 8, the subject matter of Example 1, wherein, to monitor the bandwidth demand, the cache controller is to: count a number of requests to the DRAM device within a predefined number of cycles; divide the number of requests by two; and compare the number of requests to the threshold.

In Example 9, the subject matter of Example 8, wherein the predefined number of cycles is customizable.

Example 10 is a method comprising: monitoring, by a processor, a bandwidth demand of a dynamic random-access memory (DRAM) device associated with a last level cache (LLC); performing, by the processor, a first defined number of consecutive reads from the DRAM device when the bandwidth demand exceeds a first threshold value; and performing, by the processor, a first defined number of consecutive writes of dirty lines from the LLC to the DRAM device when the bandwidth demand does not exceed the first threshold value.

In Example 11, the subject matter of Example 10, further comprising: determining whether a number of dirty lines in the LLC exceeds a second threshold value; performing a second defined number of additional consecutive writes of dirty cache lines from the LLC to the DRAM device when the number of dirty lines in the LLC exceeds the second threshold; and performing a second defined number of additional consecutive reads from the DRAM device when the number of dirty lines in the LLC does not exceed the second threshold.

In Example 12, the subject matter of Example 11, wherein the performing the second defined number of additional consecutive writes to the DRAM device comprises writing the dirty cache lines to different banks in the DRAM device.

In Example 13, the subject matter of Example 10, further comprising blocking all write operations to the DRAM device while performing the first defined number of consecutive read operations from the DRAM device.

In Example 14, the subject matter of Example 10, wherein the monitoring the bandwidth demand comprises: counting a number of requests to the DRAM device within a predefined number of cycles; dividing the number of requests by two; and comparing the number of requests to the threshold.

Example 15 is a system, comprising: a memory device; and a processor coupled to the memory device, the processor comprising a cache and a cache controller, wherein the cache controller is to: monitor a bandwidth demand of the memory device; perform a first defined number of consecutive reads from the memory device when the bandwidth demand exceeds a first threshold value; and perform a first defined number of consecutive writes of dirty lines from the cache to the memory device when the bandwidth demand does not exceed the first threshold value.

In Example 16, the subject matter of Example 15, the cache controller further to: determine whether a number of dirty lines in the cache exceeds a second threshold value; perform a second defined number of additional consecutive writes of dirty cache lines from the cache to the memory device when the number of dirty lines in the cache exceeds the second threshold; and perform a second defined number of additional consecutive reads from the memory device when the number of dirty lines in the cache does not exceed the second threshold.

In Example 17, the subject matter of Example 16, wherein, to perform the second defined number of additional consecutive writes to the memory device, the cache controller is to write the dirty cache lines to different banks in the memory device.

In Example 18, the subject matter of Example 16, wherein a modified line of the modified lines in the cache comprises an identifier that indicates that the modified line has been changed while stored in cache.

In Example 19, the subject matter of Example 15, wherein the cache controller is further to block all write operations to the memory device while performing the first defined number of consecutive read operations from the memory device.

In Example 20, the subject matter of Example 15, wherein, to monitor the bandwidth demand, the cache controller is to: count a number of requests to the memory device within a predefined number of cycles; divide the number of requests by two; and compare the number of requests to the threshold.

Example 21 is an apparatus comprising: a processor core; a last level cache (LLC) operatively coupled to the processor core; a cache controller operatively coupled to the LLC, the cache controller to: monitor a bandwidth demand of a dynamic random-access memory (DRAM) device associated with the LLC; perform a first defined number of consecutive reads from the DRAM device when the bandwidth demand exceeds a first threshold value; and perform a first defined number of consecutive writes of dirty lines from the LLC to the DRAM device when the bandwidth demand does not exceed the first threshold value.

In Example 22, the subject matter of Example 21, the cache controller further to: determine whether a number of dirty lines in the LLC exceeds a second threshold value; perform a second defined number of additional consecutive writes of dirty cache lines from the LLC to the DRAM device when the number of dirty lines in the LLC exceeds the second threshold; and perform a second defined number of additional consecutive reads from the DRAM device when the number of dirty lines in the LLC does not exceed the second threshold.

In Example 23, the subject matter of Example 22, wherein, to perform the second defined number of additional consecutive writes to the DRAM device, the cache controller is to write the dirty cache lines to different banks in the DRAM device.

In Example 24, the subject matter of Example 22, wherein the second defined number of consecutive writes from the DRAM device is 256.

In Example 25, the subject matter of Example 22, wherein the second defined number of consecutive reads from the DRAM device is customizable.

In Example 26, the subject matter of Example 21, wherein the first defined number of consecutive reads from the DRAM device is 256.

In Example 27, the subject matter of Example 21, wherein the cache controller is further to block all write operations to the DRAM device while performing the first defined number of consecutive read operations from the DRAM device.

In Example 28, the subject matter of Example 21, wherein, to monitor the bandwidth demand, the cache controller is to: count a number of requests to the DRAM device within a predefined number of cycles; divide the number of requests by two; and compare the number of requests to the threshold.

In Example 29, the subject matter of Example 28, wherein the predefined number of cycles is customizable.

Example 30 is a non-transitory computer readable medium having instructions, that when executed by an apparatus, cause the apparatus to perform a method as claimed in any of examples 10 to 14.

Example 31 is an apparatus comprising means to perform a method as claimed in any of examples 10 to 14.

While embodiments of the present disclosure have been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of embodiments of the present disclosure. It will be apparent, however, to one skilled in the art that these specific details need not be employed to practice embodiments of the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring embodiments of the present disclosure.

The embodiments are described with reference to memory-efficient LLC architecture operations in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, embodiments of the present disclosure are not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable to,' or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypt," "decrypt," "perform," "multiplications," "key expansion," "add," "mix," "reduce," "merge," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
    a processor core;
    a last level cache (LLC) operatively coupled to the processor core; a cache controller operatively coupled to the LLC, the cache controller to:
        monitor a bandwidth demand of a channel between the processor core and a dynamic random-access memory (DRAM) device associated with the LLC;
        perform a first defined number of consecutive reads from the DRAM device when the bandwidth demand exceeds a first threshold value; and perform a first defined number of consecutive writes of dirty lines from the LLC to the DRAM device when the bandwidth demand does not exceed the first threshold value;
        determine whether a number of modified lines in the LLC exceeds a second threshold value;
        perform a second defined number of additional consecutive writes of modified cache lines from the LLC to the DRAM device when the number of modified lines in the LLC exceeds the second threshold; and perform a second defined number of additional consecutive reads from the DRAM device when the number of modified lines in the LLC does not exceed the second threshold.

2. The processor of claim 1, wherein, to perform the second defined number of additional consecutive writes to the DRAM device, the cache controller is to write the modified cache lines to different banks in the DRAM device.

3. The processor of claim 1, wherein the second defined number of consecutive writes from the DRAM device is 256.

4. The processor of claim 1, wherein the second defined number of consecutive reads from the DRAM device is customizable.

5. The processor of claim 1, wherein the first defined number of consecutive reads from the DRAM device is 256.

6. The processor of claim 1, wherein the cache controller is further to block all write operations to the DRAM device while performing the first defined number of consecutive read operations from the DRAM device.

7. The processor of claim 1, wherein, to monitor the bandwidth demand, the cache controller is to:
count a number of requests to the DRAM device within a predefined number of cycles;
divide the number of requests by two; and compare the number of requests to the threshold.

8. The processor of claim 7, wherein the predefined number of cycles is customizable.

9. A method comprising:
monitoring, by a hardware processor, a bandwidth demand of a channel between a processor core and a dynamic random-access memory (DRAM) device associated with a last level cache (LLC);
performing, by the hardware processor, a first defined number of consecutive reads from the DRAM device when the bandwidth demand exceeds a first threshold value; and
performing, by the hardware processor, a first defined number of consecutive writes of modified lines from the LLC to the DRAM device when the bandwidth demand does not exceed the first threshold value;
determining whether a number of modified lines in the LLC exceeds a second threshold value;
performing a second defined number of additional consecutive writes of modified cache lines from the LLC to the DRAM device when the number of modified lines in the LLC exceeds the second threshold; and
performing a second defined number of additional consecutive reads from the DRAM device when the number of modified lines in the LLC does not exceed the second threshold.

10. The method of claim 9, wherein the performing the second defined number of additional consecutive writes to the DRAM device comprises writing the modified cache lines to different banks in the DRAM device.

11. The method of claim 9, further comprising blocking all write operations to the DRAM device while performing the first defined number of consecutive read operations from the DRAM device.

12. The method of claim 9, wherein the monitoring the bandwidth demand comprises counting a number of requests to the DRAM device within a predefined number of cycles;
dividing the number of requests by two; and comparing the number of requests to the threshold.

13. A system, comprising: a memory device; and
a processor coupled to the memory device, the processor comprising a cache and a cache controller, wherein the cache controller is to:
monitor a bandwidth demand of a channel between a processor core and the memory device;
perform a first defined number of consecutive reads from the memory device when the bandwidth demand exceeds a first threshold value; and perform a first defined number of consecutive writes of modified lines from the cache to the memory device when the bandwidth demand does not exceed the first threshold value;
determine whether a number of modified lines in the cache exceeds a second threshold value;
perform a second defined number of additional consecutive writes of modified cache lines from the cache to the memory device when the number of modified lines in the cache exceeds the second threshold; and
perform a second defined number of additional consecutive reads from the memory device when the number of modified lines in the cache does not exceed the second threshold.

14. The system of claim 13, wherein, to perform the second defined number of additional consecutive writes to the memory device, the cache controller is to write the modified cache lines to different banks in the memory device.

15. The system of claim 13, wherein a modified line of the modified lines in the cache comprises an identifier that indicates that the modified line has been changed while stored in cache.

16. The system of claim 13, wherein the cache controller is further to block all write operations to the memory device while performing the first defined number of consecutive read operations from the memory device.

17. The system of claim 13, wherein, to monitor the bandwidth demand, the cache controller is to:
count a number of requests to the memory device within a predefined number of cycles;
divide the number of requests by two; and compare the number of requests to the threshold.

* * * * *